United States Patent
Kaeriyama et al.

[11] Patent Number: 6,054,048
[45] Date of Patent: Apr. 25, 2000

[54] WATER PURIFICATION APPARATUS

[75] Inventors: Hisashi Kaeriyama; Yasukazu Kowari, both of Osaka, Japan

[73] Assignee: Nippoh Setsubi Co, Inc., Osaka, Japan

[21] Appl. No.: 09/111,298

[22] Filed: Jul. 7, 1998

[51] Int. Cl.[7] .................................. B01F 3/04; C02F 1/74
[52] U.S. Cl. .......................... 210/220; 210/199; 210/205; 210/258; 210/259; 261/37; 261/76; 261/123; 261/DIG. 75; 261/DIG. 42
[58] Field of Search ..................................... 210/199, 220, 210/258, 259, 205; 261/DIG. 75, 76, 123, 37, DIG. 42

[56] References Cited

U.S. PATENT DOCUMENTS

| | | |
|---|---|---|
| 3,734,111 | 5/1973 | McClintock . |
| 4,226,719 | 10/1980 | Woltman . |
| 4,514,343 | 4/1985 | Cramer et al. . |
| 4,710,325 | 12/1987 | Cramer et al. . |
| 5,599,455 | 2/1997 | Hukai . |
| 5,770,089 | 6/1998 | Kubo . |
| 5,776,346 | 7/1998 | Fukai . |
| 5,800,708 | 9/1998 | Kubo . |

*Primary Examiner*—Thomas M. Lithgow
*Attorney, Agent, or Firm*—Muramatsu & Associates

[57] ABSTRACT

A water purification apparatus for increasing oxygen concentration in water. The water purification apparatus includes a water pump provided in a water tank for pumping water to produce a water flow, an ejector connected to the water pump for mixing the water from the water pump with air and ejecting the water mixed with the air therethrough, an air intake pipe connected to the ejector for supplying air thereto, and a jetting outlet connected to the ejector and formed with a porous jetting nozzle having small punched openings on an end portion and outer circumference thereof and a bugle-shaped tube accommodating the porous jetting nozzle therein.

12 Claims, 3 Drawing Sheets

WATER PURIFICATION APPARATUS

FIELD OF INVENTION

This invention relates to a water purification apparatus to increase oxygen concentration in water, and more particularly, to a water purification apparatus which forces oxygen to dissolve in water by jetting a mixture of air and water from a jetting outlet disposed at an end portion of a tubular body connected to a submerged water pump.

BACKGROUND OF INVENTION

What is known as apparatuses for purifying water by increasing its dissolved oxygen concentration are those disclosed in Japanese Utility Model Registration Laid-open No. 6-57500 and Japanese Patent Laid-open No. 56-58526. Such water purification apparatuses have structures wherein water fed from an underwater pump is rapidly jetted out of a nozzle built into an ejector, thereby creating negative pressure in the vicinity of the nozzle and attracting air to the nozzle because of the negative pressure. As air and water are mixed to dissolve the oxygen into the water, a jet flow of air and water in a mixed state is ejected from a jetting outlet on the edge of a tubular body connected to the ejector. In these conventional water purification apparatuses, diffusion of a jet flow is facilitated by installing a jetting outlet nozzle having openings disposed radially or by placement of a curved plate.

In addition, as a water purification apparatus equipped with a biological filter in addition to the above-mentioned oxygen supply device, an apparatus disclosed, for example, in Japanese Patent Laid-open No. 4-346897 is known. This apparatus uses ammonia-oxidizing bacteria or nitrous acid-oxidizing bacteria, which are aerobic bacteria, disposed on a surface of the biological filter, and thereby oxidizing, in an oxygen-rich atmosphere, noxious ammonia or nitrous acid produced as a result of decomposition of organic materials, to change it to nitric acid which has no toxicity to fish.

In the above, the biological filter functions to purify water but will not play a role for activating water. Activation of water is obtained by non-thermally exerting thereon various energies such as an electric field or magnetic field at a low level, thereby causing changes in properties of water such as a decrease in oxidation-reduction potential, an increase in interfacial activity, and a decrease in surface tension so as to give water a purification function. In general, water subjected to such functioning treatment tends to have a high pH.

As an apparatus for both purification and activation of water, the one disclosed in Japanese Patent Laid-open No. 7-16598 is known. This apparatus is so structured that water to be treated flows in the state of a jet flow through the interior of a pipe where a magnetic field is formed by a magnet. The magnetic field discharges colloid particles, which makes easy the coagulation and sedimentation of clay, iron components, manganese, silicic acid component, sludge, or the like.

In the conventional water purification apparatuses, air sucked into an intake pipe collides, at a downstream of an ejector, against a water flow, thereby breaking down air bubbles and inducing the oxygen to dissolve in water. However, in the structure used in the conventional water purification apparatuses, because the jet flow of air and water in the mixed state is discharged immediately from the jetting outlet, formation of minute air bubbles does not sufficiently progress, and thus an increase in oxygen dissolution cannot reasonably be expected.

On the other hand, when increasing the amount of oxygen dissolution in order to purify water, water becomes acidic and is likely to realize an adverse effect on components in the apparatuses such as a pipe. Thus, in the conventional water purification apparatuses, adjustment of pH of water is conducted by adding chemicals. However, such water treated with chemicals has a problem in safety. In addition, in conventional apparatuses for purification and activation of water, a ring-shaped permanent magnet is used. However, activation with a magnetic field cannot result in production of water having a sufficient interfacial activation function, and it is difficult to adjust the pH of water.

SUMMARY OF THE INVENTION

The present invention has an objective to solve the above-mentioned problems and to provide a water purification apparatus which achieves reduction in the air bubble size and increases the amount of oxygen dissolution.

The present invention has another objective to provide a water purification apparatus which can purify water by increasing the amount of oxygen dissolution and can safely control acidification of water even when the amount of oxygen dissolution increases.

It is a further objective of the present invention to provide a water purification apparatus which produces water of increased oxygen dissolution having a sufficient interfacial activation function.

To solve the above problems, in a water purification apparatus wherein a jet flow of air and water in a mixed state is discharged from an ejector provided with an intake pipe and connected to a submerged water pump, and from a jetting outlet disposed at an end portion of a tubular body connected to the ejector, the water purification apparatus of the present invention is characterized in that the aforesaid jetting outlet comprises: a porous jetting nozzle having small punched openings on the end portion and an outer circumference; and a bugle-shaped tube accommodating the jetting nozzle therein. In the above, a preferred structure is that the aforesaid ejector comprises an internally installed nozzle which extends beyond the position where the intake pipe is installed and which has an opening having an area increasing at the end of the internally installed nozzle, and the tubular body connected to the ejector has a bent portion.

Further, the water purification apparatus has another aspect characterized in that a large-diameter tubular body is disposed between the above-mentioned submerged water pump and ejector, wherein a cylindrical body in which a tourmaline ore layer and a spacing layer are arranged alternately is accommodated in the large-diameter tubular body in such a way as to enable moving in and out the cylindrical body therefrom.

The jetting nozzle is a cylindrical or spherical nozzle which is installed at the end portion of the tubular body so as to close the tubular body and which forms a turbulent flow of air and water in a mixed state while minimizing the size of air bubbles. The bugle-shaped tube is for guiding a water flow in a predetermined direction while diffusing the water flow, and is also for functioning to greatly break down minute air bubbles present in the water jetted from the jetting nozzle, by making them collide against the inner surface of the bugle-shaped tube.

Further, because the internally installed nozzle extends beyond the installation position of the intake pipe, the pressure at the intake opening becomes negative, and further because the opening area of the nozzle is enlarged at the end portion, the suction area is decreased, thereby increasing the degree of negative pressure and increasing the amount of sucked air. In addition, by providing a bent portion in the tubular body connected to the ejector, size-minimization of air bubbles and dissolution of oxygen are facilitated due to collision of air bubbles against the bent wall.

By flowing water, from the submerged water pump, through the cylindrical body, the in-flow pressure is exerted on the tourmaline ore layers, and the tourmaline ore moves while rotating due to the presence of the spacing layers, thereby causing the friction effect. Tourmaline is known as a crystal mineral possessing an electrical characteristic with piezoelectric characteristics and pyroelectric characteristics, and has been further confirmed to possess an electrical characteristic referred to as "permanent electrode". By contacting tourmaline with water, weak electrolysis of water is performed, thereby making it possible to obtain water having an interfacial activation function. When exerting, e.g., pressure or an impact on tourmaline in the presence of water, electrolysis of water is facilitated, and water can be activated, thereby increasing the pH. As a result, acidification of water can be prevented even when the amount of dissolved oxygen increases.

DETAILED DESCRIPTION OF THE PREFERRED EMBODIMENTS

Figure 1:
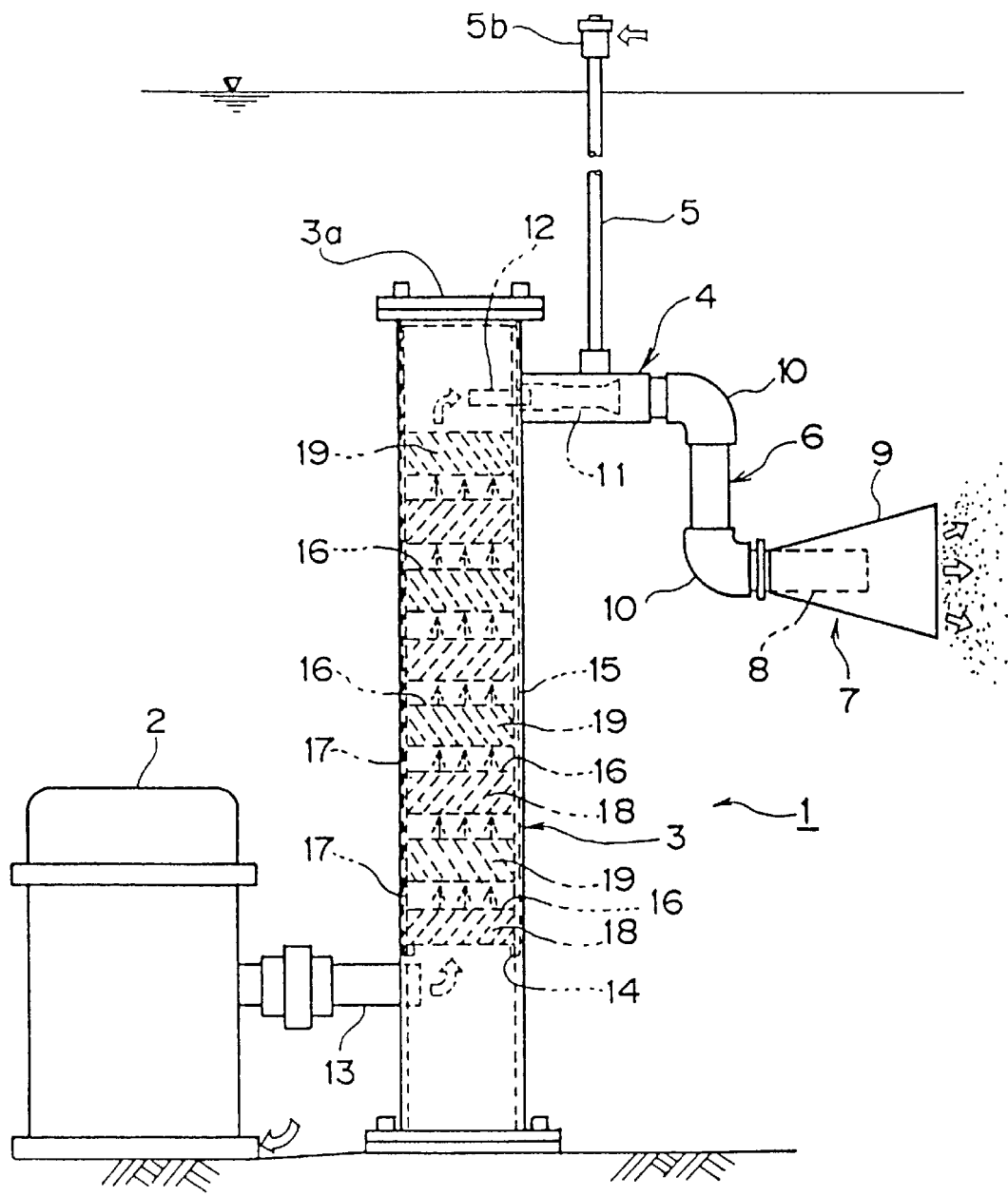
FIG. 1 is a front view of a water purification apparatus of the present invention.
Figure 2:
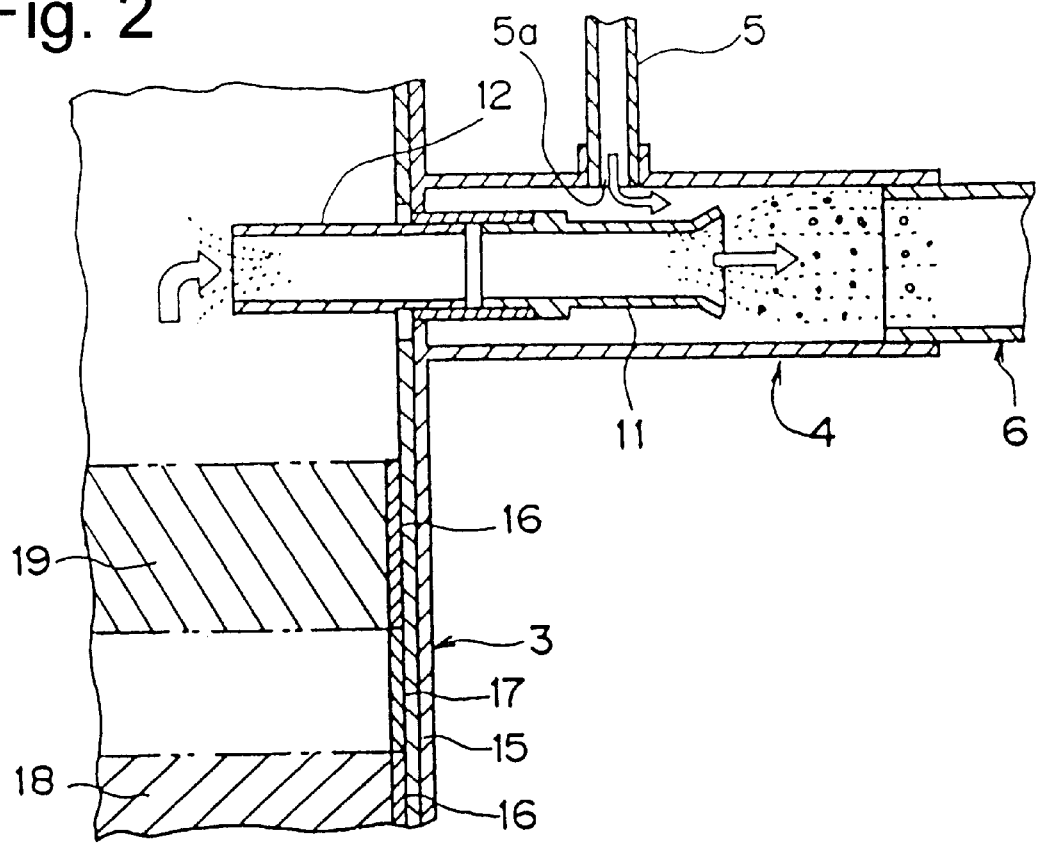
FIG. 2 is an enlarged sectional view of an ejector in the water purification apparatus of the present invention.
Figure 3:
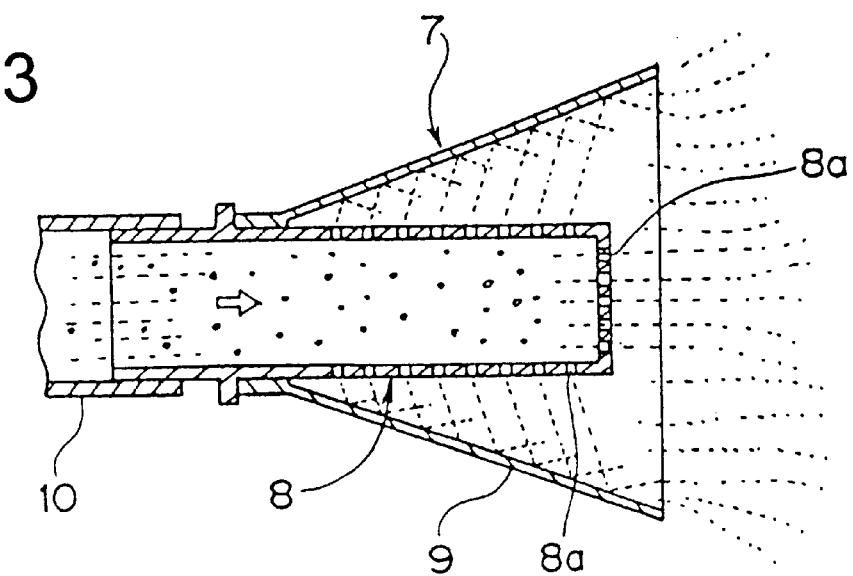
FIG. 3 is an enlarged sectional view of a jetting outlet in the water purification apparatus of the present invention.
Figure 4:
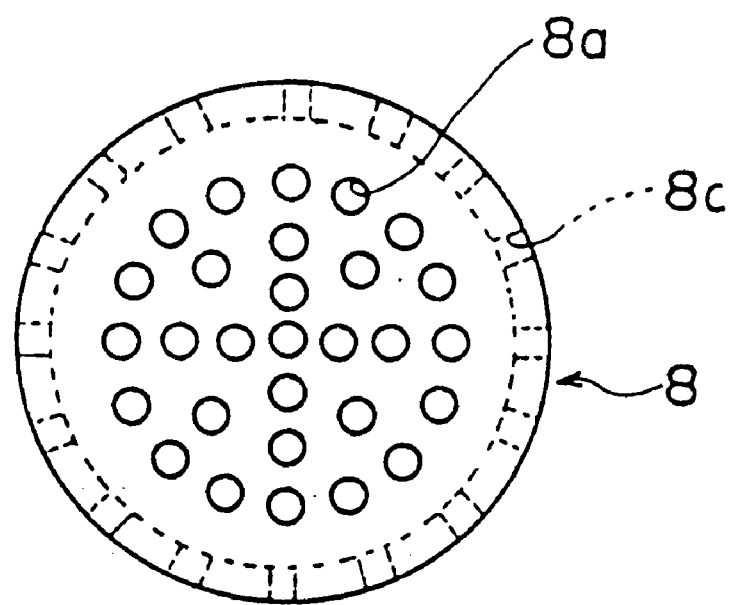
FIG. 4 is a view showing an arrangement of small openings at the end portion of a spray nozzle.

Embodiments of the present invention are next explained in detail with reference to the attached drawings. FIG. 1 is a front view of a water purification apparatus of the present invention, FIG. 2 is an enlarged sectional view of the ejector in the example of FIG. 1. FIG. 3 is an enlarged sectional view of a jetting outlet in the example of FIG. 1, and FIG. 4 is a schematic view showing an arrangement of small openings at the end portion of a spray nozzle in the jetting outlet.

The water purification apparatus 1 comprises a submerged water pump 2 in a water tank, a large-diameter tubular body 3 connected thereunder to the submerged water pump 2, an ejector 4 installed to project from an upper portion of the large-diameter tubular body 3, an intake pipe 5 connected to an upper surface of the ejector 4 and projecting from the water surface, a tubular body 6 connected to the ejector 4, and a jetting outlet 7 provided at the end of the tubular body 3 and connected to the tubular body 6.

The jetting outlet 7 comprises a jetting nozzle 8 and a bugle-shaped tube 9. The tubular body 6 is an intermediate pipe provided between the ejector 4 and the jetting outlet 7 and has a bent portion using an elbow 10. The example of FIG. 1 has two bent portions using two elbows 10. The tubular body 6 has a diameter smaller than that of the ejector 4. The jetting nozzle 8 is a nozzle which is installed in such a way as to close the end of the tubular body 3 as shown in FIGS. 3 and 4, and which is cylindrical or spherical and has a number of small punched openings 8a on an end portion as well as an outer side circumference. In the above, the shape of the jetting nozzle 8 is not limited to a cylindrical shape, and can be spherical or poly-sided or the like.

In FIG. 2, the ejector 4 comprises a nozzle 11 in its interior, and is installed to project inside the large-diameter tubular body 3 in such a way that a water inlet member 12 is detachable. The nozzle 11 is shaped to have the area of the opening enlarging at its end, and extends beyond an intake opening 5a where the intake pipe 5 is installed. Further, the intake pipe 5 comprises an air intake opening 5b over the surface of the water.

In FIG. 1, above the end portion of an in-flow pipe 13 which is connected to the submerged water pump 2 and which projects toward the interior of the large-diameter tubular body 3, a supporting member 14 is fixed to accommodate a cylindrical body 15 inserted through a cover member 3a of the large-diameter tubular body 3. In the interior of the cylindrical body 15, a metal mesh basket 16 formed at a predetermined thickness and a ring member 17 are arranged alternately. In the metal mesh basket 16, tourmaline 18 in rough or pellet 19 formed by sintering tourmaline ore powder are accommodated. The ring member 17 forms a spacing layer between two adjacent metal mesh baskets 16 in an upper and lower relationship.

By flowing water from the submerged water pump 2 through the metal mesh baskets 16, in-flow pressure is exerted on the tourmaline 18 in rough or pellets 19 and the tourmaline ore moves in the baskets 16 while rotating due to the presence of the spacing layers, thereby causing the friction effect. When a physical stimulation such as pressure or impact is added to the tourmaline in the presence of water, electrolysis of water is facilitated, and water can be activated as briefly explained below.

A positive electrode of tourmaline collects surrounding electrons and continuously sends them to a negative electrode. The collected electrons are released when the electrons stored in the negative electrode exceed a certain amount, i.e., a phenomenon of discharge of electricity occurs. At the time, when molecules of water pass through an electric field, electrolytic dissociation occurs due to instantaneous discharge of electricity, and molecules of water are separated into hydrogen ions ($H^+$) and hydroxy ions ($HO^-$). Hydrogen ions (more accurately, hydronium ions ($H_3O^+$)) are quickly attached to the negative electrode of tourmaline due to the strong electric field, and are combined with electrons discharged from the electrode, thereby being neutralized and converted to hydrogen atoms, and then being discharged to air as a hydrogen gas. On the other hand, unlike the hydrogen ions, negative ions ($HO^-$) are not neutralized, and most of the ions are combined with molecules of surrounding water, thereby being changed to a surface-active substance called hydroxyl ions.

Among ions in an equilibrium state upon separation of hydrogen ions ($H^+$) and hydroxy ions ($OH^-$), the hydrogen ions are attached to the negative electrode as $H_3O_+$ (hydronium ions) hydrated by water. Because hydrogen ions have a low electrical potential of discharge of electricity, as with normal electrolysis of water, the hydrogen ions are reduced and converted to $H_2$. On the other hand, hydroxy ions are combined with molecules of water and converted to $H_3O_2^-$ (hydroxyl ions). Because the transferring rate of the hydroxyl ions is as slow as 45% of that of hydronium ions, and further, the electrical potential of discharge of electricity of hydroxy ions is large, the hydroxyl ions are diffused as ions as is.

For the reasons above, water subjected to weak electrolysis is converted to water containing abundant $OH^-$ions, thereby raising the pH. These $OH^-$ ions, accurately $H_3O_2^+$ (hydroxyl ions), are isolated ions having no partner H+ions, and thus are in an unsteady active state in terms of energy, thereby exhibiting hydrophobic characteristics and they tend to depart from an aqueous system in water. As a result, hydroxyl ions in a state wherein hydrophobic OH⁻ is hydrated with water (hydrophilic) moves to the boundary surface of water and forms a reducing single-molecule membrane layer wherein the H of an OH⁻ group is oriented opposite to water.

It has been confirmed that water containing hydroxyl ions has a surface tension which is 10% less than that of the water containing no hydroxyl ions, and exhibits weak interfacial activation action. The water containing hydroxyl ions further exhibits actions of, for example, oil-in-water type emulsification (e.g., an HLB value of approximately 8–10 ), formation of a colloid, and actions of diffusion, solubilization, wetting, and permeation.

As described above, the water activated while passing through the cylindrical body 15 is introduced into the ejector 4. The inner diameter of the nozzle 11 of the ejector 4 is made smaller than that of the large-diameter tubular body 3, and thus a high-speed water flow is fed to the tubular body 6. At this time, since the nozzle 11 extends beyond the intake opening 5a as shown in FIG. 2, the pressure in the vicinity of the intake opening 5a becomes negative. Further, since the opening area of the nozzle 11 is enlarged at its end, the suction effect is enhanced. Because of the negative pressure and the enhanced suction effect, the amount of air intake from the intake pipe 5 is substantially increased.

The water discharged at high speed from the nozzle 11 and the sucked air collide inside the tubular body 6 having a smaller diameter than the ejector 4, and convert to water containing minute air bubbles. Since the tubular body 6 has the bent portion, air bubbles collide against the wall surface, thereby further minimizing the size of the bubbles. In accordance with a decrease in flow speed and an increase in pressure in the tubular body 6, the air bubbles present in the water flow are compressed and the pressure increases, facilitating oxygen dissolution into water. This jetting flow of air and water in a mixed state is guided to the jetting outlet 7, and jetted from the jetting nozzle 8 into water.

Since the jetting nozzle 8 is installed in such a way as to close the end of the tubular body, air bubbles are greatly broken down by the increasing pressure by collision and a decrease in flow speed, and are discharged into the interior of the bugle-shaped tube 9 through the small openings 8a. The discharged minute air bubbles collide against the inner surface of the bugle-shaped tube 9, undergoes destruction, and are further broken down, facilitating oxygen dissolution into water. As described above, the jetting outlet 7 forms a turbulent flow of air and water in a mixed state while minimizing the size of air bubbles.

Further, impact force on water causes an ultrasonic wave phenomenon and thereby highly excites, and breaks the clusters of bonding structures of water molecules. As a result, the intrinsic frequency of water rapidly rises, and negative ions and simultaneous resonance of surrounding water are generated, thereby activating the water. Further, minute air bubbles discharged in water generate ultrasonic waves when compressed and broken, i.e., the cavitation effect, and thus the minute air bubbles possess the function of decomposing dirt or impurities in the water.

As described above, because activation of water is conducted in the water purification apparatus 1, not only an increase in dissolved oxygen in water but also hydrolysis of dissolved chlorine in water is facilitated, and mitigation of stimulus taste and smell of chlorine can be expected. In addition, since oxidization of water is prevented even when the amount of dissolved oxygen can be increased, the water purification apparatus of the present invention can contribute to protective measures against "red water" in supply and drainage pipes in, for example, buildings, and removal and prevention of scale and slime.

Further, because tourmaline contains abundant mineral substances and they dissolve in water, the treated water demonstrates fostering effects on soil conditioning and farm products. In the above, in order to positively take advantage of various effects exhibited by tourmaline, the air intake opening 5b can be connected separately to an aqueous solution intake inlet which is not shown in the figures, and an aqueous solution wherein gelatinized tourmaline, for example, is dissolved, is taken in and mixed with the treated water.

This water purification apparatus is a system efficiently realizing the characteristics of tourmaline ore, i.e., the negative ion effect, by utilizing various and diverse mineral substances containing negative ions by using physical stimulation. This system which performs high excitation and activation of water, is highly safe due to no use of other energy sources or materials for operation, has an effect of conservation of natural resources, has simple structures, and is widely usable.

EXAMPLE

Comparative experimental results using the water purification apparatus of the present invention are explained below. Water used in this experiment was city water having a pH of 7 and a dissolved oxygen concentration of 10.5 mg/l. The water purification apparatus was the one indicated in FIG. 1, and tourmaline ore accommodated in a metal mesh basket 16 was one pulverized to 2–4 mm, and total 2,480 g thereof was used. After operating this water purification apparatus for six hours to treat the aforesaid city water by circulating therein, the dissolved oxygen concentration increased to 11.1 mg/l. Also, the pH of the treated water at the time was 6.8.

For comparison, the cylindrical body in which tourmaline is disposed was removed, and the same treatment of the aforesaid city water was conducted. After the treatment, the dissolved oxygen concentration increased to 1.11 mg/l, but the pH decreased to 6.0. Thus, it was confirmed that by effectively utilizing the characteristics of tourmaline in using the water purification apparatus of the present invention, acidification of water could be prevented even when the dissolved oxygen concentration increased.

As described above, the water purification apparatus of the present invention comprises: at a jetting outlet, a porous jetting nozzle having small punched openings on its end portion and outer circumference; and a bugle-shaped tube accommodating the jetting nozzle therein. Thus, air bubbles are greatly broken down due to collision and a decrease in flow speed, thereby increasing the dissolved oxygen concentration in water.

Further, according to a second embodiment of the water purification apparatus, because an ejector extends beyond the installation position of an intake pipe, and an internally installed nozzle having an opening area enlarged at the end is provided, the intake effect is enhanced, thereby increasing the degree of air suction from the intake pipe. In addition, because the tubular body has a bent portion, air bubbles are further broken down by colliding against the wall surface and are compressed with increasing pressure in accordance with a decrease in flow speed and an increase in pressure, thereby facilitating dissolution of oxygen.

According to a third embodiment of the water purification apparatus, because a cylindrical body in which a tourmaline ore layer and a spacing layer are arranged alternately is accommodated in a large-diameter tubular body, physical stimulation can be exerted effectively on tourmaline, thereby facilitating electrolysis of water, activating water, and also increasing the pH. As a result, oxidization of water can be prevented even when the dissolved oxygen concentration increases.

Although only preferred embodiments are specifically illustrated and described herein, it will be appreciated that many modifications and variations of the present invention are possible in light of the above teachings and within the purview of the appended claims without departing the spirit and intended scope of the invention.

What is claimed is:

1. A water purification apparatus for increasing oxygen concentration in water, comprising:
    a water pump provided in a water tank for pumping water to create a water flow;
    an ejector connected to the water pump for mixing the water from the water pump with air and ejecting the water mixed with the air therethrough;
    an air intake pipe connected to the ejector for supplying air to the ejector; and
    a jetting outlet connected to the ejector and formed with a porous jetting nozzle having small punched openings on an end portion and outer circumference thereof and a bugle-shaped tube accommodating the porous jetting nozzle therein.

2. A water purification apparatus as defined in claim 1, further comprising an intermediate pipe connected between the ejector and the jetting outlet, the intermediate pipe having a bent portion wherein air bubbles in the water flow from the ejector are broken down due to collision and a decrease in flow speed, thereby increasing dissolved oxygen concentration in the water.

3. A water purification apparatus as defined in claim 1, further comprising an intermediate pipe connected between the ejector and the jetting outlet, the intermediate pipe having a bent portion and having a diameter smaller than that of the ejector, wherein air bubbles in the water flow from the ejector are broken down due to collision with inner wall of the bent portion and an increase in pressure in accordance with a decrease in the diameter, thereby increasing dissolved oxygen concentration in the water.

4. A water purification apparatus as defined in claim 1, wherein the ejector extends beyond a connection position of the air intake pipe, the ejector having an internally installed nozzle having an opening area enlarged at an end, thereby creating a negative pressure in the ejector which increases an air suction force from the air intake pipe.

5. A water purification apparatus as defined in claim 1, wherein the bugle-shaped tube extends beyond the end of the porous jetting nozzle so that air bubbles ejected from the outer circumference of the porous jetting nozzle collide against an inner surface of the bugle-shaped tube to be broken down to minute air bubbles.

6. A water purification apparatus as defined in claim 1, wherein the air intake pipe has an air intake opening at an end which is above a surface of water in the tank.

7. A water purification apparatus as defined in claim 1, further comprising a tubular body in which a tourmaline ore layer and a spacing layer are arranged alternately, the tubular body being connected between the water pump and the ejector so that the water flow from the water pump exerting physical stimulation on the tourmaline, thereby activating water passing therethrough while preventing oxidization of the water.

8. A water purification apparatus as defined in claim 7, wherein the tubular body is provided in a vertical direction in the water tank and connected to the water pump at a lower portion thereof while connected to the ejector at an upper portion thereof.

9. A water purification apparatus as defined in claim 7, wherein the tourmaline ore layer and the spacing layer are arranged alternately in a cylindrical body which is detachably inserted in the tubular body.

10. A water purification apparatus for increasing oxygen concentration in water, comprising:
    a water pump provided in a water tank for pumping water to create a water flow;
    a tubular body connected to the water pump for allowing the water from the water pump to flow therethrough, the tubular body including at least one tourmaline ore layer for activating water when the water flow exerts physical stimulation on the tourmaline which facilitates electrolysis of water;
    an ejector connected to the tubular body for receiving the water flow and mixing water with air and ejecting the water mixed with the air therefrom;
    an air intake pipe connected to the ejector for supplying air thereto; and
    a jetting outlet connected to the ejector and formed with a porous jetting nozzle having small punched openings on an end portion thereof and outer circumference and a bugle-shaped tube accommodating the porous jetting nozzle therein.

11. A water purification apparatus as defined in claim 10, wherein the ejector extends beyond a connection position of the air intake pipe, the ejector having an internally installed nozzle having an opening area enlarged at an end, thereby increasing an air suction force from the air intake pipe.

12. A water purification apparatus as defined in claim 10, further comprising an intermediate pipe connected between the ejector and the jetting outlet, the intermediate pipe having at least one bent portion and having a diameter smaller than that of the ejector and a bent portion, wherein air bubbles in the water flow from the ejector are broken down due to collision with inner wall of the bent portion and an increase in pressure in accordance with a decrease in the diameter, thereby increasing dissolved oxygen concentration in the water.

* * * * *